United States Patent [19]

Ema et al.

[11] 4,378,450
[45] Mar. 29, 1983

[54] PHENOLIC RESIN COMPOSITIONS

[75] Inventors: Kenji Ema, Yokohama; Junji Hara, Kamakura; Shuhei Ikado, Yokohama; Hideo Kawashima, Kamakura; Tomohide Yokoo, Hatano, all of Japan

[73] Assignee: Mitsui Toatsu Chemicals, Inc., Tokyo, Japan

[21] Appl. No.: 130,277

[22] Filed: Mar. 14, 1980

[30] Foreign Application Priority Data

Mar. 15, 1979 [JP] Japan .................................. 54-29349
Mar. 3, 1980 [JP] Japan .................................. 55-25270

[51] Int. Cl.³ ..................... C08L 37/00; C08L 41/00; C08L 61/04
[52] U.S. Cl. .................... 525/139; 525/123; 525/126; 525/132; 525/143; 525/151; 525/152; 525/208; 525/391; 525/395; 525/404; 525/455; 525/920
[58] Field of Search ............... 525/139, 143, 132, 208, 525/920, 404, 455, 151, 152

[56] References Cited

U.S. PATENT DOCUMENTS

| | | | |
|---|---|---|---|
| 3,856,883 | 12/1974 | Dickie | 525/208 |
| 3,865,683 | 2/1975 | Schnee | 525/139 |
| 3,978,153 | 8/1976 | Sato | 525/143 |
| 4,038,454 | 7/1977 | Lehmann | 525/143 |
| 4,073,775 | 2/1978 | Matsuo | 525/132 |
| 4,085,085 | 4/1978 | Tsuchiya | 525/139 |
| 4,199,646 | 4/1980 | Hori | 525/143 |

*Primary Examiner*—Paul Lieberman
*Attorney, Agent, or Firm*—Sughrue, Mion, Zinn, Macpeak & Seas

[57] ABSTRACT

Phenolic resin compositions comprising a polymeric substance having a phenolic OH group such as phenol resins, and a rubber having an epoxy group and an epoxy equivalent of 500 to 30,000 such as butadiene copolymers, acrylic copolymers, chloroprene copolymers and urethane copolymers are provided. These resin compositions exhibit improved properties having overcome the drawback of brittle properties intrinsic of conventional phenolic resins, and also exhibit cold resistance; hence they are used as molding materials, laminating materials, casting materials, binders, etc. Further, molding resin compositions having improved solvent-resistance and metal insert properties are provided.

8 Claims, 1 Drawing Figure

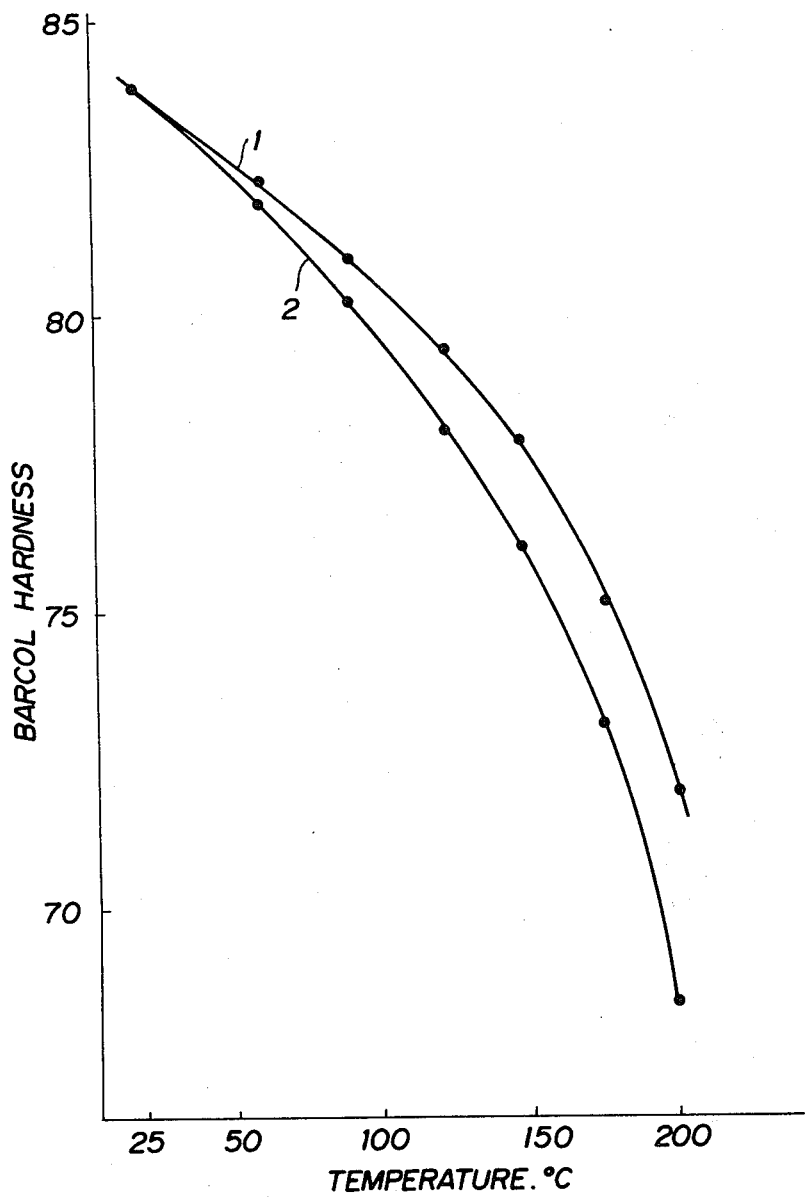

PHENOLIC RESIN COMPOSITIONS

BACKGROUND OF THE INVENTION

1. Field of the Invention

The present invention relates to phenolic resin composition usable as molding materials, laminating materials, paints and lacquers, adhesives, binders for shell molds, grindstones, brake linings, etc., casting materials, foaming agents, etc.

Further, the present invention relates to molding phenolic resin compositions.

2. Description of the Prior Art

Polymeric substances having a phenolic OH group, employable in the present invention, include phenolic resins, alkenylphenolic polymers, copolymers of alkenylphenols with other polymerizable monomers, polymeric substances derived from phenolic compounds and paraxylylene dihalides or paraxylylene dialkyl ethers, etc. Polymers having a phenolic OH group other than phenolic resins will be hereinafter abbreviated to phenolic polymers.

As is well known, phenolic resins include general-purpose novolak type phenolic resins, novolak type phenolic resins having a high content of ortho bond and resol type phenolic resins. As for these resins, after heat treatment thereof (if necessary, a formaldehyde-generating compound such as hexamethylenetetramine being added thereto prior to the treatment), the resulting cured substances have been employed for various uses. Namely the resins have been widely used as molding materials, laminating materials, paints and lacquers, adhesives, various binders for shell molds, grindstones, brake linings, etc., casting materials for ornamental goods, tools, tablewares, etc., foaming materials, etc., and are commercially valuable materials. They, however, have a drawback of being intrinsically brittle, which is a common problem to phenolic resins. Thus, for example, in case where they are employed as molding materials, it has been difficult to produce molded products having complicated shapes or molded products of large sizes, since cracks are liable to occur in the resulting molded products.

Further, phenolic resins have been employed for molded products containing inserts, such as gripping parts of metallic tablewares, knives, forks, etc. In this case, conventional phenolic resins have been inferior in the metal insert properties, and particularly when molded products are produced at low temperatures as in winter season, cracks have been liable to occur on the contact surface of metals with phenolic resins, resulting in low production yield.

Still further, when phenolic resins are employed for laminated sheets, they are inferior in cold punchability. Thus, punching of such laminated sheets has been carried out by elevating their temperature up to about 120° C. to soften them. In this case, however, when the temperature of the sheets is returned to ordinary temperatures after completion of the above hot punching, expansion shrinkage occurs in the base; hence the resulting products have dimensional errors and also warp etc. Thus it has been impossible to apply such sheets to the fields of electrical equipments requiring high performances.

Furthermore, even when phenolic resins are employed as various binders, for example, when they are employed as brake lining, etc., crack, break, etc. occur in the resulting brake materials, etc. Thus, it has been impossible to display full performances.

In addition to these various practical problems, the resins are very weak in the thermal impact at cold-hot repetitions. Thus, molding materials and laminating materials consisting of phenol resins have had a drawback that cracks readily occur through thermal impact at cold-hot repetitions.

Next, phenolic polymers will be mentioned. As for methods of employing the phenolic polymers, there are illustrated a method of adding a formaldehyde-generating compound such as hexamethylenetetramine thereto and subjecting the resulting mixture to heat treatment to obtain a cured product for use, and a method of mixing a phenolic polymer with an epoxy resin and further adding a curing accelerator for epoxy resins to the resulting mixture, followed by subjecting them to heat treatment to obtain a cured product for use. These cured products have a superior heat resistance, and some of them have now been commercially employed. These materials, however, also have a drawback of brittleness. Thus, when they are applied to molding materials, laminating materials, paints and lacquers, adhesives, various binders such as shell molds, grindstones, brake linings, etc., casting materials for e.g. ornamental goods, tools, tablewares, etc., foaming materials, etc., they have had drawbacks common to those of phenolic resins.

Heretofore, various studies have been made for overcoming the above-mentioned various drawbacks of phenolic resins, and various methods have been proposed. Among them, methods of modifying phenolic resins with rubbers have been widely carried out. For example there is a method wherein e.g. a novolak type phenolic resin is blended e.g. by roll kneading with a nitrile rubber consisting of units of acrylonitrile and butadiene, as a rubber having a relatively good compatibility, to prepare a resin having a nitrile rubber dispersed in a novolak type phenolic resin, and this resin is employed. Further, U.S. Pat. No. 3,536,783 discloses a rubber-modified novolak type phenolic resin prepared by uniformly dispersing a novolak type phenolic resin in a latex of nitrile rubber consisting of units of acrylonitrile and butadiene.

It is observed that the above-mentioned two problems, i.e. prevention of the resins from crack occurrence when the resins are employed as molding materials and punchability of laminated sheets prepared employing the resins have been improved by the above-mentioned methods of the prior art, but other various problems have not yet been solved as mentioned below.

Particularly, when molding materials, laminating materials, brake materials, etc. prepared employing the above-mentioned rubber-modified phenolic resins are employed under a condition of cold temperature, particularly −30° C. or lower, the effectiveness due to the rubber-modification is lost and cracks are very liable to occur.

As for the crack occurrence caused by thermal impact through cold-hot repetitions, product having a sufficiently high impact resistance has not yet been obtained. For example, the problem is raised when they are employed in districts where temperature difference is large between day and night, or when they are employed at places subjected to repeated thermal impacts.

Further, the molding materials prepared employing the above-mentioned nitrile rubber are insufficient in the oil resistance and solvent resistance. For example when the molding materials are employed at places where they are always brought into contact with machine oils, solvents, etc., they are accompanied with fading of the surface of the molding materials and increase in the weight, and also reduction in the performances is notable.

Still further, in the finishing step of the molding materials where degreasing with trichloroethylene or the like is often carried out, trichloroethylene resistance is inferior, the surface condition is also inferior, particularly fading occurs, resulting in reduction of the quality of the molded products thus obtained.

Furthermore, for improving the metal insert properties of phenolic resins, an attempt of employing nitrile rubbers together with phenolic resins has been made. However, although the metal insert properties have been considerably improved according to the method, a practical problem has been raised because of its inferior solvent resistance. Namely, metal-inserted, molded products usually have oils, fats and fatty oils attached thereto, and for removing them, degreasing step of immersing them in a solvent such as trichloroethylene is indispensable. However, in the case of the molded products obtained according to the above-mentioned method, fading or color unevenness occurs after immersion in trichloroethylene. Thus, values as commodities have been notably reduced. When molding materials, laminating materials of phenolic resins obtained employing the above-mentioned nitrile rubbers are applied to certain uses such as electric parts to be subjected to a long time thermal hysteresis, a great deal of reduction in the physical properties occurs. Thus they have been restricted in their uses.

SUMMARY OF THE INVENTION

An object of the present invention is to provide phenolic resin composition which have an improved cold resistance; do not readily cause cracks even when subjected to thermal impact of cold-hot repetitions; have superior oil resistance, gasoline resistance and solvent resistance; and have been improved in their intrinsic drawback of brittleness.

Another object of the present invention is to provide molding materials and laminating materials being small in the deterioration of physical properties even when subjected to long time thermal hysteresis.

A still other object of the present invention is to provide phenolic resin compositions for molding being improved in the metal insert properties and solvent resistance.

A further object of the present invention is to provide molding materials which cause neither fading nor color unevenness even after immersion in trichloroethylene, in addition to the above-mentioned improvement in the metal insert properties.

Other objects of the present invention will be apparent from the description mentioned below.

In accordance with the present invention, phenolic resin compositions comprising a polymeric substance having a phenolic OH group and a rubber having an epoxy group and an epoxy equivalent of 500 to 30,000 is provided.

BRIEF DESCRIPTION OF THE DRAWING

The drawing illustrates a relationship between Barcol hardness of molding materials of Example and Comparative example and temperatures, wherein curve 1 shows a relationship between Barcol hardness in Example 44 and temperatures and curve 2 shows a relationship between Barcol hardness in Comparative Example 22 and temperatures.

DETAILED DESCRIPTION OF THE INVENTION

Polymeric substances having a phenolic OH group, employed in the present invention include phenolic resins and phenolic polymers.

Phenolic resins are obtained by reacting phenolic compounds with aldehydes in a conventional manner. As for phenolic compounds, phenol, cresols, xylenols, alkylphenols having $C_1$–$C_{20}$ alkyl group such as ethylphenol, propylphenol, butylphenol, amylphenol, octylphenol, nonylphenol, dodecylphenol, and phenols having a structure similar to those of alkylphenols such as bisphenol A, phenylphenol, cumylphenol, styrenized phenol, alkenylphenols such as p-vinylphenol, o-isopropenylphenol, m-isopropenylphenol, p-isopropenylphenol, etc. are illustrated. Further, as for aldehyde components, aqueous solution of formaldehyde, paraformaldehyde, trioxymethylene, hexamethylenetetramine, other aliphatic aldehydes, and substituted or unsubstituted aromatic aldehydes are illustrated.

As for phenolic resins, there are known novolak type phenolic resin obtained by reacting the above-mentioned phenolic compounds with formaldehyde or the like in the presence of an acidic catalyst such as hydrochloric acid, sulfuric acid, oxalic acid, p-toluenesulfonic acid, phosphoric acid, in a molar ratio of aldehyde components to phenolic compound components of 0.6 to 0.95; novolak type phenolic resins having a high content of ortho bond, obtained by reacting phenolic compound components with aldehyde components in the presence of a catalyst, divalent metal halides, divalent metal hydroxides (such as magnesium hydroxide, calcium hydroxide), divalent metal oxides (such as magnesium oxide, cadmium oxide) or organic acid salts of divalent metals (such as magnesium acetate, zinc acetate) (pH being made 2 to 4 in the case of the latter three catalysts), in a molar ratio of aldehyde components to phenolic compound components of 0.6 to 0.95; and resol type phenolic resins obtained by reacting phenolic compound components with aldehyde components in the presence of a basic catalyst such as caustic alkalies, ammonia or amines, in a molar ratio of aldehyde components to phenolic compound components of 0.7 to 3.0.

Next, phenolic polymers include alkenylphenolic polymers such as polyvinylphenol, polyisopropenylphenol, copolymers of alkenylphenols with other polymerizable monomers such as styrene, α-methylstyrene, acrylonitrile, vinyl chloride, acrylic acid esters, methacrylic acid esters, maleic anhydride or vinyl esters of various other organic acids, and polymeric substances disclosed in British Pat. No. 1150203 to Albright & Wilson Ltd. and commercially available as a tradename of Xylok (derived from phenolic compounds and paraxylylene dihalides such as paraxylylene dichloride or paraxylylene dialkyl ethers such as paraxylylene glycoldimethyl ether.

Rubbers having an epoxy group referred to herein mean polymers having an epoxy equivalent of 500 to 30,000 and a glass transition temperature of 25° C. or lower; they exhibit a viscous liquid state or a semisolid state at room temperature; and their preferable glass transition temperatures are 0° C. or lower.

As for the rubbers, for example the following are employed:

acrylic copolymers having an epoxy group in their molecule; butadiene copolymers containing 50% by weight or more of butadiene units and having an epoxy group in their molecule; chloroprene copolymers having an epoxy group in their molecule (these three copolymers will be referred to collectively as rubber A); and urethane copolymers having an epoxy group in their molecule (which will be hereinafter referred to as rubber B).

Rubbers A refer to polymers obtained by subjecting a monomer having an unsaturated bond and an epoxy group in its molecule (hereinafter referred to as monomer A) such as glycydyl acrylate, glycydyl methacrylate, allyl glycidyl ether, and at least one kind of other polymerizable monomers to bulk polymerization, emulsion polymerization, suspension polymerization or solution polymerization in the presence of a conventional radical initiator.

As for the polymerizable monomers employable in the present invention, aromatic vinyl compounds such as styrene, vinyltoluene, vinylxylene, chlorostyrene, bromostyrene, dichlorostyrene, α-methylstyrene, acrylonitrile, methacrylonitrile, acrylic acid, methacrylic acid, acrylic acid esters such as methyl acrylate, ethyl acrylate, propyl acrylate, butyl acrylate, hexyl acrylate, 2-hydroxyethyl acrylate, 2-hydroxypropyl acrylate, 2-ethylhexyl acrylate, methacrylic acid esters such as methyl methacrylate, ethyl methacrylate, propyl methacrylate, butyl methacrylate, hexyl methacrylate, lauryl methacrylate, 2-ethylhexyl methacrylate, acrylamide, methacrylamide, isoprene, butadiene, chloroprene, maleic anhydride, etc. are mentioned.

As for the radical initiators employable in the present invention, organic peroxides such as benzoyl peroxide di-t-butyl peroxide, t-butyl perbenzoate, cumene hydroperoxide, methyl ethyl ketone peroxide, organic azo catalysts such as 2,2'-azobisisobutyronitrile, 2,2'-azobis(2,4-dimethylvaleronitrile), 2,2'-azobis(4-methoxy-2,4-dimethylvaleronitrile), 1,1'-azobiscyclohexanone-1-carbonitrile, 2,2'-azobis(2-amidinopropane)hydrochloride, inorganic peroxides such as potassium persulfate, ammonium persulfate, potassium bromate, hydrogen peroxide, redox catalysts wherein peroxides and reducing agents such as ferrous sulfate are employed at the same time, etc. are mentioned.

The polymerization is carried out in a conventional manner of polymerization such as bulk polymerization, emulsion polymerization, suspension polymerization, solution polymerization, at a polymerization temperature of 0° C. to 150° C. and under the atmospheric pressure or an elevated pressure. In this case, chain transfer agents such as dodecyl mercaptan, lauryl mercaptan may be at the same time employed as molecular weight modifier.

Preferable combinations of polymerizable monomers of main two-component system and main three-component system for preparing the above-mentioned rubbers A are shown in the following Table 1:

Table 1

Combination of two-component system

Monomer A-ethyl acrylate
Monomer A-propyl acrylate
Monomer A-butyl acrylate
Monomer A-hexyl acrylate
Monomer A-butyl methacrylate
Monomer A-hexyl methacrylate
Monomer A-chloroprene Combination of three-component system Monomer A-ethyl acrylate-acrylonitrile
Monomer A-propyl acrylate-acrylonitrile
Monomer A-butyl acrylate-acrylonitrile
Monomer A-hexyl acrylate-acrylonitrile
Monomer A-lauryl methacrylate-acrylonitrile
Monomer A-2-ethylhexyl acrylate-acrylonitrile
Monomer A-butadiene-styrene
Monomer A-butadiene-acrylonitrile In accordance with the combinations of polymerizable monomers shown in Table 1, it is possible to prepare rubbers A by introducing an epoxy group into the molecule of acrylic copolymers, butadiene copolymers containing 50% by weight or more of butadiene units, chloroprene copolymers, etc. The content of epoxy group in rubbers A has no particular limitation, but in order that the effectiveness of the present invention is exhibited most, the content is usually preferred to be about 500 to 30,000 in terms of epoxy equivalent. This range corresponds to about 0.5 to 30% by weight in case where glycidyl methacrylate is employed as raw material. In addition, the epoxy equivalent referred to herein means an equivalent weight per one epoxy group (g/equiv).

Next, rubbers B are prepared in the following manner: In the first place, preparation of starting raw material will be mentioned. Polyoxyalkyleneglycols such as polyoxyethyleneglycol, polyoxypropyleneglycol, polyoxypropylenepolyoxyethyleneglycol, polyoxybutylene glycol, adipic acid type polyesterglycols obtained from adipic acid and diethylene glycol or the like, or polyesterglycols obtained from ε-caprolactone or the like, etc. are reacted with 2,4-tolylene diisocyanate, diphenylmethane diisocyanate, naphthylene diisocyanate, diphenylsulfone diisocyanate or the like to prepare a prepolymer having isocyanate group at its terminal.

As for the above-mentioned polyoxyalkyleneglycols, adipic acid type polyesterglycols and polyesterglycols, those of a hydroxyl equivalent of 100 to 2,000 are employable, and as for the isocyanate equivalent of prepolymer obtained by reaction with isocyanates, those of 500 to 6,000 are preferable.

As for the preparation of rubbers B by the use of prepolymer having isocyanate group at its terminal, the following two methods are mentioned:

a method of reacting the above-mentioned prepolymer with a compound having an epoxy group and a hydroxyl group in its molecule, such as glycidol, and a method of reacting the prepolymer with a compound having a hydroxyl group and a double bond in its molecule (hereinafter abbreviated to monomer B) such as hydroxyethyl acrylate, hydroxyethyl methacrylate, to prepare a urethane rubber having a double bond at its terminal, which rubber is then polymerized in the presence of monomer A and a polymerizable monomer.

In the case of the former method, glycidol is added to the prepolymer so that the amount of hydroxyl group in glycidol is 1.0 to 1.5 equivalent per one NCO equivalent, followed by reaction at a temperature of 50° to 100° C. In this case, a conventional catalyst such as tert-amines, tetraalkyldiamines, aminoalcohols, dialkyltin compounds may be also employed. Further, a solvent capable of dissolving prepolymer and glycidol together, such as ethyl acetate, methyl ethyl ketone, xylene, toluene may be also employed, if necessary. As for the reaction, it is possible to regard the point when 90% or more of NCO group has reacted with hydroxyl group in glycidol, as the end point of the reaction.

The epoxy equivalent of rubbers B thus prepared is in the range of 500 to 6,000.

In the case of the latter method, a monomer B is added to the prepolymer so that the amount of hydroxyl group is 1.0 to 1.5 equivalent per one NCO equivalent, followed by reaction at a temperature of 50° C. to 100° C. In this case, conventional catalyst and solvent may be employed, if necessary. As for the reaction, it is possible to regard the point when 90% or more of NCO group has reacted with hydroxyl group in the monomer B, as the end point of the reaction. A urethane rubber thus obtained, having an unsaturated double bond in the terminal of the molecule is reacted with a monomer A, and if necessary, in the presence of a polymerizable monomer, and in the presence of a radical initiator to obtain an epoxy-containing urethane rubber.

In this case, as for the polymerizable monomers employable at the same time with the monomer A and the urethane rubber having an unsaturated double bond in the terminal of the molecule, the following are mentioned:

aromatic vinyl monomers such as styrene, vinyltoluene, vinylxylene, chlorostyrene, bromostyrene, dichlorostyrene, α-methylstyrene, acrylonitrile, methacrylonitrile, acrylic acid, methacrylic acid, acrylic acid esters such as methylacrylate, ethyl acrylate, propylacrylate, butylacrylate, hexylacrylate, methacrylic acid esters such as methyl methacrylate, ethyl methacrylate, propyl methacrylate, butyl methacrylate, hexyl methacrylate, etc.

One kind or more of them may be employed. Rubbers B can be prepared by bulk polymerization or solution polymerization, employing the above-mentioned monomer A, urethane rubber having an unsaturated group at the terminal of the polymer, and if necessary, one kind or more of polymerizable monomers. In this case, the same kind of radical initiators as employed in the preparation of rubbers A may be employed, and the polymerization temperature is preferably in the range of room temperature to 100° C. Further, the amounts of monomers A and urethane rubbers having an unsaturated group at the terminal of the molecule, employable in this case are preferably 0.5 to 30% by weight and 10 to 90% by weight, respectively. The epoxy equivalent of the rubbers B thus prepared is in the range of 500 to 30,000.

Rubbers A and B having an epoxy group are mixed in solid state as it is, latex state or solution state, in an amount of 1 to 100 parts by weight, preferably 2 to 60 parts by weight, more preferably 2 to 30 parts by weight, in terms of the amount of solid matters calculated from those of the epoxy group-containing rubbers, with 100 parts by weight of a polymeric substance having a phenolic OH group. For example, when metal insert properties are referred to with this respect, if the above-mentioned amount is less than 1 part by weight, the effectiveness upon metal insert properties is poor, while if it exceeds 100 parts by weight, mixing at the time of melt-mixing is difficult, resulting in a problem of processability.

The epoxy group-containing rubbers, after added to a polymeric substance having a phenolic OH group, are melt-mixed at a temperature of room temperature to 250° C.

The process for producing the phenolic resin compositions of the present invention will be mentioned in more detail.

If the rubbers having an epoxy group are employed without any solvent, novolak type phenolic resins or phenolic polymers may be conveniently mixed in molten state. In this case, kneading by means of e.g. rolls is effective. Further, in the case of the mixing or kneading it is more preferable to heat them for reducing their viscosity, if necessary.

Further, in case where the rubbers having an epoxy group are employed in the form of latex or suspension, mere mixing of the both may be sufficient in the case of resol type phenolic resins, but in some cases, the latex or suspension is preferably stabilized in the presence of surfactants or the like. Further, in case where they are applied to novolak type phenolic resins or phenolic polymers, they may be melt-mixed while dehydrated on heating after mixing, or the latex or suspension may be added to the above-mentioned resins on heating and they are melt-mixed under dehydration.

Further, in case where the rubbers having an epoxy group are employed in the form of solution, if the solvent employed is a common solvent to those for phenolic resins, e.g. ethyl acetate, the solution may be, as it is, added to resol type phenolic resins, but if the solvent is not a common one, the solvent may be removed under reduced pressure, followed by replacement by a suitable solvent such as methanol, ethanol, acetone, etc. Further, in case where they are applied to novolak type phenolic resins or phenolic polymers, if the solvent employed is a common one to those for the above-mentioned resins, they may be applied in the form of solution as it is, to the resins, or they may be applied also in the form of solid after removal of solvent. Further, in the case of being insoluble in the above-mentioned resins, the solution of the rubbers having an epoxy group may be successively added to the resins on heating and they may be melt-mixed while the solvent is removed.

In the above-mentioned phenolic resin compositions, epoxy group may not be always reacted with phenolic OH group, but, in some cases, reaction of epoxy group with phenolic OH group may be promoted by heating or employing a conventional curing accelerator for epoxy resins such as boron trifluoride-amine complexes, 5-member heterocyclic amines, 6-member heterocyclic amines, tertiary amines, tertiary amine salts. In this case, the amount of curing accelerator added is preferably 0 to 5 parts by weight based on 100 parts by weight of the phenolic resin compositions.

To the phenolic resin compositions obtained by the melt-mixing polymeric substances having a phenolic OH group with epoxy group-containing rubbers are added a curing agent such as hexamethylenetetramine and if necessary, a curing auxiliary, a filler, a pigment, etc., followed by kneading at a roll temperature of 80° to 170° C., milling into molding powder and compression molding, transfer molding or injection molding at a temperature of 140° to 250° C. to obtain molded products.

The present invention has such an advantage that by optionally selecting epoxy group-containing rubbers, it is possible to optionally produce relatively rigid materials to flexible materials. Further, in the case of conventional cured products of rubber-modified phenolic resins with nitrile rubbers, a portion of the rubbers are dissolved out when the products are extracted with solvents, whereas in the case of cured products of the phenolic resin compositions of the present invention, epoxy group-containing rubbers are not dissolved out even when the products are extracted with solvents. This fact is one of the specific features of the present invention as never seen in the prior art, and constitutes the reason of the superior solvent resistance of the products of the present invention. In the case of the present invention, the epoxy group-containing rubbers are not only present in the cured products in a reacted state, but also present in a uniformly particulate state, and there is observed no intramolecularly plasticized phenomenon caused by the fact that a portion of rubbers is dissolved and present in the cured products as seen in the case of conventional rubber-modified phenolic resins.

Thus, low-temperature impact characteristic properties are notably improved, and also the proportion of reduction in the high-temperature surface hardness is far less than those of conventional products. This results in a great advantage when the compositions of the present invention are employed as binders for brake lining, etc. Namely, when conventional rubber-modified phenolic resins are employed, high-temperature hardness reduction has been so large that a problem in practical use has been raised, whereas according to the present invention, such a drawback has been overcome to be able to employ the compositions of the present invention as binders for brake lining, etc.

As for the resin compositions of the present invention, a formaldehyde-generating compound such as hexamethylenetetramine may be employed as a curing agent, if necessary, and it is also possible to further add fillers such as calcium carbonate, clay, talc, silica, aluminum oxide, antimony trioxide and reinforcing agent, e.g. mineral fibers such as glass fiber, asbestos fiber or synthetic fibers such as polyvinyl alcohol fiber, nylon fiber, etc. Further, it is also possible to dissolve the phenolic resin compositions in a solvent and immerse in the resulting solution, various substrates such as glass cloth, glass mat, asbestos paper, synthetic fiber mat, paper, cotton cloth, etc., followed by removing the solvent to prepare a dry prepreg.

Further it is also possible to dissolve the phenolic resin compositions in various organic solvents such as alcohol solvents e.g. methyl alcohol, ethyl alcohol, butyl alcohol, octyl alcohol, 2-ethylhexyl alcohol, nonyl alcohol, etc., ketone solvents e.g. acetone, methylethylketone, methyl isobutyl ketone, isophorone, etc., ether solvents e.g. isopropylether, n-butyl ether, ethylene glycol monomethylether, ethyleneglycol monoethyl glycol, etc., ester solvents e.g. ethylacetate, isobutyl acetate, n-butyl acetate, 2-ethylhexyl acetate, etc., aromatic solvents e.g. toluene, xylene, cyclohexane, ethylbenzene, etc. or solvent mixtures of the foregoing to thereby prepare varnishes, and if necessary to modify them with tung oil, linseed oil, epoxy resin, furan resin, cumarone resin or the like, to thereby make use of the resulting products as resins for paints and lacquers.

Still further, it is also possible to make use of the phenolic resin compositions comprising resol type phenolic resins as high temperature or room temperature adhesives, in the aqueous solution state such as suspension state, latex state or in the solution state, employing a suitable curing agent such as acidic substance e.g. benzenesulfonic acid, toluenesulfonic acid, phenosulfonic acid, phosphoric acid, chloroalkylsulfonic acid, hydrochloric acid, sulfuric acid, oxalic acid, etc.

Furthermore, it is also possible to make use of the phenolic resin compositions comprising phenolic polymers as it is, as adhesives, and further utilize them as high temperature adhesives, employing epoxy resins and curing accelerators for epoxy resins at the same time.

Further it is possible to make use of the phenolic resin compositions as various binders such as shell molds, grindstones, brake linings, etc., by blending hexamethylenetetramine to the compositions, well kneading the resulting blend by means of hot rolls or the like and finely milling the resulting material into a particle size of 200 meshes or larger to prepare a powdery resin.

Further it is possible to make use of the phenolic resin compositions comprising resol type phenolic resins as various binders such as shell molds, grindstones, brake linings, etc., in the form of liquid resin as it is.

Further it is possible to make use of the phenolic resin compositions as casting resins, by casting them and if necessary, a mixture thereof comprising a curing agent such as hexamethylenetetramine, curing accelerator, filler, pigment, etc., into various casting frames.

Further it is possible to make use of the phenolic resin compositions as foamed products, by subjecting the compositions to heat treatment, employing a foaming agent such as dinitropentamethylenetetramine, azodicarbonamide, etc. and if necessary, in the presence of a curing agent such as hexamethylenetetramine.

As mentioned above, the phenolic resin compositions of the present invention can be widely used as molding materials, laminating materials, paints and lacquers, adhesives, various binders such as shell molds, grindstones, brake linings, casting materials for ornamental goods, tools, tablewares, foaming agents, etc., and are commercially valuable materials.

Next, representative examples of the epoxy group-containing rubbers employed in the present invention and then Examples of the phenolic resin compositions of the present invention will be mentioned, but the present invention is not to be construed as limiting the scope of the present invention.

[I] Preparation examples of epoxy group-containing rubbers

Preparation examples of butadiene copolymers

1. Preparation of rubber (1)

| Butadiene | 62 parts by weight |
| Acrylonitrile | 35 parts by weight |
| Glycidyl methacrylate | 3 parts by weight |
| n-Dodecyl mercaptan | 1 parts by weight |
| Potassium persulfate | 0.5 parts by weight |
| Anionic surfactant | 5 parts by weight |
| Water | 200 parts by weight |

The above-mentioned materials having the above-mentioned constituting proportion were subjected to polymerization in an autoclave at 30° C. for 20 hours to obtain a rubber (1). The content of solid matters in this rubber was 30% by weight, and after drying in vacuo at a temperature of 50° C. or lower, the epoxy equivalent of the resulting rubber (1) was about 4,900.

2. Preparation of rubber (2)

| Butadiene | 64 parts by weight |
| Styrene | 30 parts by weight |
| Glycidyl methacrylate | 6 parts by weight |
| n-Dodecyl mercaptan | 3 parts by weight |
| Potassium persulfate | 0.5 parts by weight |

| | |
|---|---|
| Anionic surfactant | 5 parts by weight |
| Water | 200 parts by weight |

The above-mentioned materials having the above-mentioned constituting proportion were subjected to polymerization in an autoclave at 30° C. for 20 hours to obtain a rubber (2). The content of solid matters in this rubber was 30% by weight, and after drying in vacuo at a temperature of 50° C. or lower, the epoxy equivalent of the resulting rubber (2) was about 2,400.

Preparation examples of acrylic copolymer rubbers

3. Preparation of rubber solution (3)

| | |
|---|---|
| Butyl acrylate | 67 parts by weight |
| Acrylonitrile | 30 parts by weight |
| Glycidyl methacrylate | 3 parts by weight |
| Ethyl acetate | 100 parts by weight |
| Azobisisobutyronitrile | 1 parts by weight |

The above-mentioned materials having the above-mentioned constituting proportion were subjected to polymerization under the atmospheric pressure, under reflux of ethyl acetate for 3 hours, followed by further adding 1 part by weight or azobisisobutyronitrile, and further polymerization under reflux of ethyl acetate for 3 hours to obtain a rubber solution (3). The content of solid matters in the rubber solution (3) was 49% by weight, and after removal of the solvent, the epoxy equivalent of the resulting rubber (3) was about B 4,900.

4. Preparation of rubber (4)

| | |
|---|---|
| Butyl acrylate | 64 parts by weight |
| Acrylonitrile | 30 parts by weight |
| Glycidyl acrylate | 6 parts by weight |
| Ethyl acetate | 100 parts by weight |
| Azobisisobutyronitrile | 1 parts by weight |

The above-mentioned materials having the above-mentioned constituting proportion were subjected to polymerization under the atmospheric pressure, under reflux of ethyl acetate for 3 hours, followed by removing unreacted monomers and solvent to obtain a rubber (4). The epoxy equivalent of this rubber (4) was about 2,500.

5. Preparation of rubber solution (5)

| | |
|---|---|
| Ethyl acetate | 50 parts by weight |
| Butyl acrylate | 97 parts by weight |
| Glycidyl methacrylate | 3 parts by weight |
| Ethyl acetate | 50 parts by weight |
| 2,2'-Azobis-(2,4-dimethylvaleronitrile) | 1 part by weight |

Among the above-mentioned materials, the first-mentioned ethyl acetate was firstly fed, and a mixture of the other materials was successively added under the atmospheric pressure, under reflux of ethyl acetate for 5 hours, to effect polymerization, followed by further adding 0.5 part by weight of 2,2'-azobis-(2,4-dimethylvaleronitrile), and polymerization under reflux of ethyl acetate for 3 hours to obtain a rubber solution (5). The content of solid matters in the rubber solution (5) was 49% by weight, and after removal of the solvent, the epoxy equivalent of the rubber (5) was about 4,900.

6. Preparation of rubber (6)

| | |
|---|---|
| Ethyl acetate | 50 parts by weight |
| Butyl acrylate | 72 parts by weight |
| Butyl methacrylate | 5 parts by weight |
| Acrylonitrile | 20 parts by weight |
| Glycidyl methacrylate | 3 parts by weight |
| 2-2'-Azobis(2,4-dimethylvaleronitrile) | 1 parts by weight |
| Ethyl acetate | 50 parts by weight |

Among the above-mentioned materials, the first-mentioned ethyl acetate was firstly added, and a mixture of the other materials was successively added under the atmospheric pressure, under reflux of ethyl acetate for 5 hours, to effect polymerization, followed by further adding 1 part by weight of 2,2'-azobis(2,4-dimethylvaleronitrile), and polymerization under reflux of ethyl acetate for 3 hours and thereafter removing unreacted monomers and solvent to obtain a rubber (6). The epoxy equivalent of the rubber (6) was about 4,900.

Preparation examples of chloroprene copolymer rubber:

7. Preparation of rubber solution (7)

| | |
|---|---|
| Chloroprene | 94 parts by weight |
| Glycidyl methacrylate | 3 parts by weight |
| Styrene | 3 parts by weight |
| Benzene | 350 parts by weight |
| n-Dodecyl mercaptan | 3 parts by weight |
| Benzoyl peroxide | 1.5 parts by weight |

The above-mentioned materials having the above-mentioned constituting proportion were subjected to polymerization in an autoclave at polymerization temperature of 60° to 80° C. for 6 hours to obtain a rubber solution (7). The content of solid matters in the rubber solution (7) was about 22% by weight, and after removal of solvent, the epoxy equivalent of the rubber (7) was about 4,900.

8. Preparation of rubber solution (8)

| | |
|---|---|
| Chloroprene | 94 parts by weight |
| Glycidyl methacrylate | 6 parts by weight |
| Benzene | 350 parts by weight |
| n-Dodecyl mercaptan | 3 parts by weight |
| Benzoyl peroxide | 1.5 parts by weight |

The above-mentioned materials having the above-mentioned constituting proportion were subjected to polymerization in an autoclave at polymerization temperatures of 60° to 80° C. for 6 hours to obtain a rubber solution (8). The content of solid matters in the rubber solution (8) was about 22% by weight, and after removal of solvent, the epoxy equivalent of the rubber (8) was about 2,400.

Preparation examples of urethane polymer rubbers:

9. Preparation of rubber solution (9)

2,4-Tolylenediisocyanate (174 g) and dibutyltin dilaurate (0.01 g) were added to 2,000 g of polyoxypropylene glycol having an OH equivalent of 2,000, to effect reaction at 70° C. for 5 hours and thereby, obtain a prepolymer having a NCO equivalent of about 2,150. Hydroxyethyl acrylate (122 g) was added thereto, followed by reaction at 70° C. for 7 hours to obtain a polymer having an unsaturation equivalent of about 2,300. To 60 parts by weight of the polymer thus obtained were added 40 parts by weight of ethyl acetate, followed by elevating the temperature to 80° C. Thereafter a mixture of

| Butyl acrylate | 37 parts by weight |
| Glycidyl methacrylate | 3 parts by weight |
| n-Dodecyl mercaptan | 7 parts by weight and |
| Azobisisobutyronitrile | 1 parts by weight | was added over 8 hours to effect polymerization. After completion of the addition, the resulting material was further maintained at 80° C. for 2 hours. The content of solid matters in the resulting rubber solution (9) was about 70% by weight, and after removal of solvent, the epoxy equivalent of the rubber (9) was about 4,900.

10. Preparation of rubber (10)

2,4-Tolylenediisocyanate (87 g) and dibutyltin dilaurate (0.01 g) were added to 1,000 g of polyoxypropylene-polyoxyethylene glycol having an OH equivalent of 2,000, to effect reaction at 70° C. for 5 hours and thereby obtain a prepolymer having a NCO equivalent of 2,150. To this prepolymer were added 39 g of glycidol to effect reaction at 70° C. for 7 hours and thereby obtain a rubber (10) having an epoxy equivalent of 2,200.

[II] Production examples of phenolic resin compositions

Example 1

A general-purpose novolak type phenolic resin prepared in the presence of hydrochloric acid catalyst and having a softening point of 92° to 98° C. (Novolak #2000, tradename of a product manufactured by Mitsui Toatsu Chemicals, Japan) was employed as the general-purpose novolak type phenolic resin for the present invention. Namely, 150 g of the above-mentioned rubber (1) were added to 500 g of the Novolak #2000, and water was distilled off by vacuum drying and removed to the outside of the system. The resulting material was melt-mixed at 160° C. for 60 minutes with stirring to obtain a phenolic resin composition 1.

Example 2

In the same manner as in Example 1, 150 g of the above-mentioned rubber solution (3) were added to 500 g of Novolak #2000, and the solvent was distilled off by vacuum drying and removed to the outside of the system. The resulting material was melt-mixed at 160° C. for 60 minutes with stirring to obtain a phenolic resin composition 2.

Example 3

In the same manner as in Example 1, 50 g of the above-mentioned rubber (4) were added to 500 g of Novolak #2000, and the resulting material was melt-mixed at 180° C. for 60 minutes with stirring to obtain a phenolic resin composition 3.

Any of the phenolic resin compositions obtained above, together with other materials according to the following blending formulation were kneaded by means of heated rolls at 110° C. for 3 minutes, and then milled to prepare molding powder:

| Phenolic resin composition | 100 parts by weight |

| -continued | |
|---|---|
| Hexamethylenetetramine | 12 parts by weight |
| Wood flour | 100 parts by weight |
| Magnesium stearate | 1 parts by weight |
| Carbon black | 5 parts by weight |

For comparison, a case where a usual rubber containing no epoxy group was employed and a case where Novolak #2000 alone was employed, are mentioned below as Comparative examples 1 and 2.

Comparative Example 1

The same composition as that employed in preparation of the above-mentioned rubber (1) except that no glycidyl methacrylate was employed, was subjected to polymerization under the same conditions as those employed in preparation of the rubber (1), to obtain a rubber latex (C-1).

Next, 500 g of Novolak #2000 and 150 g of rubber latex (C-1) obtained above were melt-mixed under the same conditions as in Example 1 to obtain a phenolic resin composition, from which molding powder was then prepared according to the above-mentioned formulation.

Comparative Example 2

Novolak #2000 together with other materials according to the following blending formulation were kneaded by means of heated rolls at 110° C. for 3 minutes and then milled to prepare molding powder:

| Novolak #2000 | 100 parts by weight |
| Hexamethylenetetramine | 12 parts by weight |
| Wood flour | 100 parts by weight |
| Magnesium stearate | 1 parts by weight |
| Carbon black | 5 parts by weight |

The respective molding powders obtained above were molded under the conditions of 170° C., 5 minutes and 100 Kg/cm$^2$, and the respective characteristic values of the resulting molded products were observed according to the testing methods shown below. The results are shown in Table 2.

(1) Metal insert properties

Employing a metal test piece of brass having 30 mm in diameter and 5 mm thick, a metal insert molded product of 50 mm in diameter and 10 mm thick was prepared so that the metal piece was located at the central part and yet on the back surface of the molded product. This molded product was then maintained in an oven at 120° C. for 60 minutes and thereafter maintained in dry ice-methanol at −40° C. for 60 minutes. Condition of cracks which occurred in the molded product obtained above was observed by judgement by means of naked eyes.

(2) Solvent resistance

A molded product of 50 mm in diameter and 10 mm thick was immersed in trichloroethylene for 30 minutes, and then the surface of the resulting product was observed. The results were classified into the following ranks for evaluation:

| (i) The surface condition was almost unchanged. | A |
| (ii) The surface faded somewhat. | B |
| (iii) Fading and color unevenness of the | C |

-continued

| | | |
|---|---|---|
| surface were each to a medium extent. | | |
| (iv) Fading and color unevenness of the surface were each to a large extent. | | D |

TABLE 2

| | Metal insert properties | Solvent resistance |
|---|---|---|
| Present invention | Among 5 test pieces, | |
| Molded product according to Example 1 | all of the five, no crack | A |
| Molded product according to Example 2 | all of the five, no crack | A |
| Molded product according to Example 3 | all of the five, no crack | A |
| Comparative examples | Among 5 test pieces, | |
| Molded product according to Comparative ex. 1 | one had crack | D |
| Molded product according to Comparative ex. 2 | all of the five had crack | A |

Example 4

As in Example 1, 100 g of the above-mentioned rubber (2) were added to 500 g of Novolak #2000, and water was distilled off by vacuum drying and removed to the outside of the system. The resulting material was melt-mixed at 160° C. for 60 minutes with stirring to obtain a phenolic resin composition 4.

Example 5

As in Example 1, 50 g of the above-mentioned rubber solution (5) were added to 500 g of Novolak #2000, and solvent was distilled off by vacuum drying and removed to the outside of the system. The resulting material was melt-mixed at 160° C. for 60 minutes with stirring to obtain a phenolic resin composition 5.

Example 6

As in Example 1, 100 g of the above-mentioned rubber solution (5) were added to 500 g of Novolak #2000, and solvent was distilled off by vacuum drying and removed to the outside of the system. The resulting material was melt-mixed at 160° C. for 60 minutes with stirring to obtain a phenolic resin composition 6.

Example 7

As in Example 1, 200 g of the above-mentioned rubber solution (5) were added to 500 g of Novolak #2000, and solvent was distilled off by vacuum drying and removed to the outside of the system. The resulting material was melt-kneaded by means of heated rolls at 160° C. for 15 minutes to obtain a phenolic resin composition 7.

Example 8

As in Example 1, 50 g of the above-mentioned rubber (6) were added to 500 g of Novolak #2000, and the resulting material was melt-mixed at 160° C. for 90 minutes with stirring to obtain a phenolic resin composition 8.

Example 9

As in Example 1, 100 g of the above-mentioned rubber (6) were added to 500 g of Novolak #2000, and the resulting material was melt-kneaded by means of heated rolls at 160° C. for 15 minutes to obtain a phenolic resin composition 9.

Example 10

As in Example 1, 150 g of the above-mentioned rubber solution (7) were added to 500 g of Novolak #2000, and solvent was distilled off by vacuum drying and removed to the outside of the system. The resulting material was melt-kneaded by means of heated rolls at 160° C. for 15 minutes to obtain a phenolic resin composition 10.

Example 11

As in Example 1, 150 g of the above-mentioned rubber solution (8) were added to 500 g of Novolak #2000, and solvent was distilled off by vacuum drying and removed to the outside of the system. The resulting material was melt-kneaded by means of heated rolls at 160° C. for 15 minutes to obtain a phenolic resin composition 11.

Example 12

As in Example 1, 70 g of the above-mentioned rubber solution (9) were added to 500 g of Novolak #2000, and solvent was distilled off by vacuum drying and removed to the outside of the system. The resulting material was melt-kneaded by means of heated rolls at 160° C. for 15 minutes to obtain a phenolic resin composition 12.

Example 13

As in Example 1, 140 g of the above-mentioned rubber solution (9) were added to 500 g of Novolak #2000, and solvent was distilled off by vacuum drying and removed to the outside of the system. The resulting material was melt-kneaded by means of heated rolls at 160° C. for 15 minutes to obtain a phenolic resin composition 13.

Example 14

As in Example 1, 50 g of the above-mentioned rubber (10) were added to 500 g of Novolak #2000, and the resulting material was melt-kneaded by means of heated rolls at 160° C. for 15 minutes to obtain a phenolic resin composition 14.

Example 15

A novolak type phenolic resin having a molar ratio of phenol/formaldehyde of 0.75, a content of ortho bond as high as about 75% and a softening point of 88° to 95° C. (Novolak #9000, tradename of a product manufactured by Mitsui Toatsu Chemicals, Japan) was employed.

Namely, 100 g of the above-mentioned rubber latex (2) were added to 500 g of the above-mentioned Novolak #9000, and water was distilled off by vacuum drying and removed to the outside of the system. The resulting material was melt-kneaded by means of heated rolls at 160° C. for 15 minutes to obtain a phenolic resin composition 15.

Example 16

The above-mentioned rubber solution (3) (100 g) was added to 500 g of the above-mentioned Novolak #9000, and solvent was distilled off by vacuum drying and removed to the outside of the system. The resulting material was melt-mixed at 160° C. for 60 minutes with stirring to obtain a phenolic resin composition 16.

Example 17

The above-mentioned rubber solution (8) (150 g) was added to 500 g of the above-mentioned Novolak #9000, and solvent was distilled off by vacuum drying and removed to the outside of the system. The resulting material was melt-kneaded by means of heated rolls at 160° C. for 15 minutes to obtain a phenolic resin composition 17.

Example 18

The above-mentioned rubber solution (9) (70 g) was added to 500 g of the above-mentioned Novolak #9000, and solvent was distilled off by vacuum drying and removed to the outside of the system. The resulting material was melt-kneaded by means of heated rolls at 160° C. for 15 minutes to obtain a phenolic resin composition 18.

Any of the phenolic resin compositions obtained above, together with other materials according to the following blending formulation were kneaded by means of heated rolls at 110° C. for 3 minutes, and then milled to prepare molding powder:

| | |
|---|---|
| Phenolic resin composition | 100 parts by weight |
| Hexamethylenetetramine | 12 parts by weight |
| Wood flour | 100 parts by weight |
| Magnesium stearate | 1 parts by weight |
| Carbon black | 5 parts by weight |

For comparison, materials of the same compositions as those employed in preparation of the above-mentioned rubbers, rubber latexes and rubber solutions except that monomers having an unsaturated bond and an epoxy group in their molecule (abbreviated to monomer A) were not used, were prepared under the same conditions as in preparation of the above-mentioned rubbers, rubber latexes and rubber solutions, and these materials are referred to as C-1 to C-9, respectively.

For example, C-3 refers to a material prepared employing the same composition as that employed in preparation of the above-mentioned rubber solution (3) except that no glycidyl methacrylate was employed, and under the same conditions as in preparation of the rubber solution (3).

C-10 refers to a material prepared employing the same composition as that employed in preparation of the above-mentioned rubber (10) except that n-propyl alcohol was employed in place of glycidol, and under the same conditions as in preparation of the rubber (10).

Comparative Example 3

A phenolic resin composition was prepared in the same manner as in Example 4 except that rubber latex C-2 was employed.

Comparative Example 4

A phenolic resin composition was prepared in the same manner as in Example 5 except that rubber solution C-5 was employed.

Comparative Example 5

A phenolic resin composition was prepared in the same manner as in Example 6 except that rubber solution C-5 was employed.

Comparative Example 6

A phenolic resin composition was prepared in the same manner as in Example 7 except that rubber solution C-5 was employed.

Comparative Example 7

A phenolic resin composition was prepared in the same manner as in Example 8 except that rubber C-6 was employed.

Comparative Example 8

A phenolic resin composition was prepared in the same manner as in Example 9 except that rubber C-6 was employed.

Comparative Example 9

A phenolic resin composition was prepared in the same manner as in Example 10 except that rubber solution C-7 was employed.

Comparative Example 10

A phenolic resin composition was prepared in the same manner as in Example 11 except that rubber solution C-8 was employed.

Comparative Example 11

A phenolic resin composition was prepared in the same manner as in Example 12 except that rubber solution C-9 was employed.

Comparative Example 12

A phenolic resin composition was prepared in the same manner as in Example 13 except that rubber solution C-9 was employed.

Comparative Example 13

A phenolic resin composition was prepared in the same manner as in Example 14 except that rubber C-10 was employed.

Comparative Example 14

A phenolic resin composition was prepared in the same manner as in Example 15 except that rubber latex C-2 was employed.

Comparative Example 15

A phenolic resin composition was prepared in the same manner as in Example 16 except that rubber solution C-3 was employed.

Comparative Example 16

A phenolic resin composition was prepared in the same manner as in Example 17 except that rubber solution C-8 was employed.

Comparative Example 17

A phenolic resin composition was prepared in the same manner as in Example 18 except that rubber solution C-9 was employed.

Any of the phenolic resin compositions of Comparative examples 3 to 17, together with other materials according to the following formulation were kneaded by means of heated rolls at 110° C. for 3 minutes, and then milled to prepare molding powder:

| | |
|---|---|
| Phenolic resin composition | 100 parts by weight |

-continued

| | |
|---|---|
| Hexamethylenetetramine | 12 parts by weight |
| Wood flour | 100 parts by weight |
| Magnesium stearate | 1 parts by weight |
| Carbon black | 5 parts by weight |

(1) Solvent resistance

Molding powders obtained according to the above-mentioned Examples and Comparative examples were molded under the conditions of 170° C., 5 minutes and 100 Kg/cm², and the resulting molded products were milled into a particle size of 100 meshes or larger, and extracted with various solvents, by means of Soxhlet's extractor, under reflux for 10 hours to acquire percentages extraction. The results are shown in Table 3.

As seen from Table 3, when rubbers having an epoxy group are employed, the resulting phenolic resin compositions are superior in the solvent resistance as compared with those in case where rubbers having no epoxy group are employed.

TABLE 3

| | Percentage extraction* | | |
|---|---|---|---|
| Molding Powder | Trichloro-ethylene (%) | Acetone (%) | Xylene (%) |
| Example 4 | 0.20 | 0.24 | 0.28 |
| Example 5 | 0.22 | 0.21 | 0.18 |
| Example 6 | 0.34 | 0.38 | 0.35 |
| Example 7 | 0.70 | 0.78 | 0.74 |
| Example 8 | 0.40 | 0.42 | 0.40 |
| Example 9 | 0.72 | 0.76 | 0.73 |
| Example 10 | 0.30 | 0.26 | 0.32 |
| Example 11 | 0.20 | 0.18 | 0.21 |
| Example 12 | 0.28 | 0.32 | 0.30 |
| Example 13 | 0.71 | 0.78 | 0.70 |
| Example 14 | 0.18 | 0.20 | 0.15 |
| Example 15 | 0.24 | 0.27 | 0.31 |
| Example 16 | 0.38 | 0.40 | 0.33 |
| Example 17 | 0.18 | 0.20 | 0.18 |
| Example 18 | 0.40 | 0.42 | 0.35 |
| Compara. ex. 3 | 3.0 | 2.8 | 2.9 |
| Compara. ex. 4 | 2.2 | 2.2 | 2.2 |
| Compara. ex. 5 | 4.3 | 4.2 | 4.1 |
| Compara. ex. 6 | 7.9 | 7.7 | 7.8 |
| Compara. ex. 7 | 4.2 | 4.2 | 4.2 |
| Compara. ex. 8 | 7.8 | 7.5 | 7.6 |
| Compara. ex. 9 | 2.9 | 2.8 | 2.9 |
| Compara. ex. 10 | 2.9 | 2.8 | 2.9 |
| Compara. ex. 11 | 4.2 | 4.2 | 4.2 |
| Compara. ex. 12 | 7.6 | 7.4 | 7.5 |
| Compara. ex. 13 | 4.2 | 4.0 | 4.1 |
| Compara. ex. 14 | 3.0 | 2.9 | 3.0 |
| Compara. ex. 15 | 4.1 | 4.0 | 4.1 |
| Compara. ex. 16 | 2.9 | 2.8 | 2.9 |
| Compara. ex. 17 | 4.1 | 4.1 | 4.1 |

*Molding powder (10g) was extracted with 100 g of solvent, and percentage extraction was calculated from the difference between the original weight and that after extraction of the powder.

(2) Metal insert properties

Employing a metal test piece of cast iron having a regularly hexagonal shape of 29 mm in side and 13 mm thick and also having a cylindrical hollow part of 20 mm in diameter at its central part, a metal insert molded product of 50 mm in diameter and 30 mm thick was prepared so that the metal piece was located at the central part and yet on the back surface of the molded product.

The metal insert molded product was subjected to a hot-cold test wherein one cycle consisted of retention at 180° C. for 30 minutes and subsequent retention at −40° C. for 40 minutes, and crack which occurred at the boundary between the metal part and the cured resin part was observed by naked eyes. The metal insert properties were expressed by the number of cycle at which crack occurred. The results are shown in Table 4.

According to this test, it is indicated that the more the number of cycle, the superior the metal insert properties of the material.

As seen from Table 4, products having rubbers containing an epoxy group are superior in the metal insert properties to those having rubbers containing no epoxy group.

TABLE 4

| Molded product | Metal insert properties, member of cycle at which crack occured |
|---|---|
| Example 4 *1 | 27 times |
| Example 6 *1 | 52 times |
| Example 7 *1 | 47 times |
| Example 8 *1 | 42 times |
| Example 12 *1 | 34 times |
| Example 15 *2 | 24 times |
| Example 16 *2 | 32 times |
| Example 17 *2 | 22 times |
| Example 18 *2 | 33 times |
| Compara. ex. 2 *1 | 2 times |
| Compara. ex. 3 *1 | 20 times |
| Compara. ex. 5 *1 | 38 times |
| Compara. ex. 6 *1 | 37 times |
| Compara. ex. 7 *1 | 33 times |
| Compara. ex. 11 *1 | 23 times |
| Compara. ex. 14 *2 | 13 times |
| Compara. ex. 15 *2 | 22 times |
| Compara. ex. 16 *2 | 12 times |
| Compara. ex. 17 *2 | 24 times |

*1 Molding conditions: 170° C., 5 minutes, 100 Kg/cm²
*2 Molding conditions: 160° C., 5 minutes, 100 Kg/cm²

EXAMPLE 19

As the resol type phenolic resin solution, the following was employed:

Namely, 94 g of phenol, 70 g of nonylphenol, 137 g of 37% formalin aqueous solution and 5 g of 28% ammonia aqueous solution were fed into a reaction vessel, and reacted with stirring at 95° C. for 5 hours. After completion of the reaction, the reaction product was dehydrated under reduced pressure and dehydration was stopped when the inner temperature reached 90° C., followed by cooling and adding acetone to obtain a resol type phenolic resin solution having a resin content of 40%.

Rubber (1) (10 g) was employed based on 100 g of the thus obtained resol type phenolic resin solution.

The rubber (1) was completely dehydrated, dissolved in 10 g of ethyl acetate and employed in the form of solution of rubber in ethyl acetate.

Namely, a solution of rubber in ethyl acetate, containing 10 g of rubber (1) was added to 100 g of the resol type phenolic resin solution to obtain a phenolic resin composition 19 having a resin content of about 39.0%.

EXAMPLE 20

Rubber (2) (7 g) was employed based on 100 g of the above-mentioned resol type phenolic resin solution.

Epoxy group-containing rubber (2) was completely dehydrated, dissolved in 10 g of ethyl acetate and employed in the form of solution of rubber in ethyl acetate.

Namely, a solution of rubber in ethyl acetate, containing 7 g of rubber (2) was added to 100 g of the above-mentioned resol type phenolic resin solution to obtain a phenolic resin composition 20 having a resin content of 38.0%.

EXAMPLE 21

Similarly, rubber solution (5) (8 g) was added to 100 g of the above-mentioned resol type phenolic resin solution, to obtain a phenolic resin composition 21 having a resin content of about 40.7%.

EXAMPLE 22

Similarly, rubber (6) (4 g) was added to 100 g of the above-mentioned resol type phenolic resin solution, followed by stirring at room temperature for 60 minutes to obtain a phenolic resin composition 22 having a resin content of about 42.3%.

EXAMPLE 23

Similarly, rubber solution (8) (12 g) was employed based on 100 g of the above-mentioned resol type phenolic resin solution.

Rubber solution (8) was subjected to complete removal of solvent, dissolved in 10 g of ethyl acetate and employed in the form of solution of rubber in ethyl acetate.

Namely, a solution of rubber in ethyl acetate, containing 12 g of rubber solution (8) was added to 100 g of the resol type phenolic resin solution to obtain a phenolic resin composition 23 having a resin content of about 38.0%.

EXAMPLE 24

Rubber solution (9) (6 g) was added to 100 g of the above-mentioned resol type phenolic resin solution to obtain a phenolic resin composition 24 having a resin content of about 41.7%.

Employing the respective phenolic resin compositions obtained in Examples 19 to 24, a cotton linter paper was impregnated therewith and then dried to obtain a base having 45% by weight of resin adhered. Ten sheets of this base were overlaid on a copper foil having an adhesive adhered thereto, and they were subjected to contact bonding at 160° C. under a pressure of 100 Kg/cm$^2$ for 50 minutes to obtain a copper-lined, laminated sheet of 1.5 mm thick.

Comparative Example 18

Employing the above-mentioned resol type phenolic resin solution, a cotton linter paper was impregnated therewith and then dried to obtain a base having 45% by weight of resin adhered. Ten sheets of this base were overlaid on a copper foil having an adhesive adhered thereto, and they were subjected to contact bonding at 160° C., under a pressure of 100 Kg/cm$^2$ for 50 minutes to obtain a copper-lined, laminated sheet of 1.5 mm thick.

The physical properties of the copper-laid, laminated sheets obtained above are shown in Table 5.

TABLE 5

| Laminated sheet | Punching processability, room temperature *1 | Specific volume resistance ($\Omega$-cm), normal condition, C-90/20/65 *2 |
| --- | --- | --- |
| According to Example 19 (phenolic resin composition 19) | 70–80 | $10^{10}$–$10^{11}$ |
| According to Example 20 (phenolic resin composition 20) | 70–80 | $10^{10}$–$10^{11}$ |
| According to Example 21 (phenolic resin composition 21) | 80–90 | $10^{10}$–$10^{11}$ |
| According to Example 22 (phenolic resin composition 22) | 80–90 | $10^{10}$–$10^{11}$ |
| According to Example 23 (phenolic resin composition 23) | 70–80 | $10^{10}$–$10^{11}$ |
| According to Example 24 (phenolic resin composition 24) | 80–90 | $10^{10}$–$10^{11}$ |
| According to Comparative example 18 (resol type phenolic resin solution) | 20–30 | $10^{10}$–$10^{11}$ |

*1 According to ASTM D 617-44
*2 According to JIS C-6481

As shown from Table 5, the phenolic resin compositions of the present invention exhibit superior punching processability when they are made up into laminated sheets.

EXAMPLE 25

A poly-p-vinylphenyl having a weight average molecular weight of about 6,000 (hereinafter abbreviated to phenolic polymer A) (Maruzen M, tradename of a product manufactured by Maruzen Sekiyu K.K., Japan) was employed.

Namely, 150 g of rubber (1) were added to 500 g of the phenolic polymer A, and water was distilled off by vacuum drying and removed to the outside of the system. The resulting material was melt-kneaded by means of heated rolls at 160° C., for 15 minutes to obtain a phenolic resin composition 25.

EXAMPLE 26

Similarly, 100 g of rubber solution (3) were added to 500 g of the phenolic polymer A, and solvent was distilled off by vacuum drying and removed to the outside of the system. The resulting material was melt-kneaded by means of heated rolls at 160° C. for 15 minutes to obtain a phenolic resin composition 26.

EXAMPLE 27

Similarly, 50 g of rubber (4) were added to 500 g of the phenolic polymer A, and the resulting material was melt-kneaded at 160° C. for 15 minutes to obtain a phenolic resin composition 27.

EXAMPLE 28

Similarly, 100 g of rubber solution (5) were added to 500 g of the phenolic polymer A, and solvent was distilled off by vacuum drying and removed to the outside of the system. The resulting material was melt-kneaded by heated rolls at 160° C. for 15 minutes to obtain a phenolic resin composition 28.

EXAMPLE 29

Similarly, 200 g of rubber solution (5) were added to 500 g of the phenolic polymer A, and solvent was distilled off by vacuum drying and removed to the outside of the system. The resulting material was melt-kneaded by means of heated rolls at 160° C. for 15 minutes to obtain a phenolic resin composition 29.

EXAMPLE 30

Similarly, 200 g of rubber solution (7) were added to 500 g of the phenolic polymer A, and solvent was distilled off by vacuum drying and removed to the outside of the system. The resulting material was melt-kneaded by means of heated rolls at 160° C. for 15 minutes to obtain a phenolic resin composition 30.

EXAMPLE 31

Similarly, 50 g of rubber (10) were added to 500 g of the phenolic polymer A, and the resulting material was melt-kneaded by means of heated rolls at 160° C. for 15 minutes to obtain a phenolic resin composition 31.

Employing the respective phenolic resin compositions obtained in Examples 25 to 31, together with other materials according to the following formulation, molding materials were prepared:

| | |
|---|---|
| Phenolic resin composition | 66 parts by weight |
| Bisphenol A type epoxy resin (Epikote 828, tradename of product made by Shell Chemical Co., epoxy equivalent: 190) | 100 parts by weight |
| Boron trifluoride-monoethylamine complex (made by Shell Chemical Co., BF$_3$: 400) | 1 parts by weight |

The above-mentioned blends were melt-kneaded by means of heated rolls at 80° C. for 8 minutes, and then molded under the conditions of 170° C., 10 minutes, 100 Kg/cm$^2$, and the resulting molded products were maintained at 180° C., for 10 hours to effect post cure.

Comparative Example 19

A molded product was prepared in the same manner as mentioned above except that phenolic polymer A was employed in place of phenolic resin compositions.

The physical properties of the molded products obtained above are shown in Table 6.

TABLE 6

| Molded product | Impact strength, kg-cm*[1] | | |
|---|---|---|---|
| | −40° C. | −20° C. | normal condition |
| According to Example 25 (phenolic resin composition 25) | 30 | 50 | 50 |
| According to Example 26 (phenolic resin composition 26) | 20 | 40 | 50 |
| According to Example 27 (phenolic resin composition 27) | 20 | 40 | 50 |
| According to Example 28 (phenolic resin composition 28) | 40 | 50 | 50 |
| According to Example 29 (phenolic resin composition 29) | 50 | 50 | 60 |
| According to Example 30 (phenolic resin composition 30) | 30 | 40 | 40 |
| According to Example 31 (phenolic resin composition 31) | 30 | 40 | 40 |
| According to Comparative example 19 (phenolic polymer A) | 10 or less | 10 | 30 |

TABLE 6-continued

| Molded product | Impact strength, kg-cm*[1] | | |
|---|---|---|---|
| | −40° C. | −20° C. | normal condition |

*[1]A wedge of ⅛ inch in diameter was applied to a molded product of 50 × 50 × 5 mm, and a weight of 1 Kg was dropped from an optical height to observe a height (cm) at which crack occurred in the molded product.

As seen from Table 6, a notable improvement in the impact strength not only under normal condition but also at low temperatures is observed with phenolic polymer A according to the method of the present invention.

Example 32

Acrylonitrile (270 g), styrene (630 g), p-isopropenylphenol (100 g), ethyl acetate (250 g) and 2,2'-azobis(2,4-dimethylvaleronitrile) (5 g) were fed and polymerized at 60° C. for 4 hours, followed by further adding ethyl acetate (250 g) and 2,2'-azobis(2,4-dimethylvaleronitrile) (5 g) and further polymerization at 60° C. for 4 hours. Solvent was then removed under reduced pressure to obtain a copolymer of isopropenylphenol (hereinafter abbreviated to phenolic polymer B). The viscosity of 5% solution of phenolic polymer B in ethyl acetate, at 25° C., was 1.75 cps.

Rubber (1) (150 g) was added to 500 g of phenolic polymer B, and water was distilled off by vacuum drying and removed to the outside of the system. The resulting material was melt-kneaded by means of heated rolls at 160° C. for 15 minutes to obtain a phenolic resin composition 32.

Example 33

Similarly, 75 g of rubber solution (5) were added to 500 g of the phenolic polymer B, and solvent was distilled off by vacuum drying and removed to the outside of the system. The resulting material was melt-kneaded by means of heated rolls at 160° C. for 15 minutes to obtain a phenolic resin composition 33.

Example 34

Similarly, 150 g of rubber solution (5) were added to 500 g of the phenolic polymer B, and solvent was distilled off by vacuum drying and removed to the outside of the system. The resulting material was melt-kneaded by means of heated rolls at 160° C. for 15 minutes to obtain a phenolic resin composition 34.

Example 35

Similarly, 50 g of rubber (6) were added to 500 g of the phenolic polymer B, and the resulting material was melt-kneaded by means of heated rolls at 160° C. for 15 minutes to obtain a phenolic resin composition 35.

Example 36

Similarly, 200 g of rubber solution (7) were added to 500 g of the phenolic polymer B, and solvent was distilled off by vacuum drying and removed to the outside of the system. The resulting material was melt-kneaded by means of heated rolls at 160° C. for 15 minutes to obtain a phenolic resin composition 36.

Example 37

Similarly, 50 g of rubber (10) were added to 500 g of the phenolic polymer B, and the resulting material was melt-kneaded by means of heated rolls at 160° C. for 15 minutes to obtain a phenolic resin composition 37.

Employing the respective phenolic resin compositions obtained in Examples 32 to 37, together with other materials according to the following formulation, molding materials were prepared:

| | |
|---|---|
| Phenolic resin composition | 100 parts by weight |
| Hexamethylenetetramine | 5 parts by weight |
| Magnesium stearate | 0.5 parts by weight |

The above blends were kneaded by means of heated rolls at 150° C. for 3 minutes and then molded under the conditions of 230° C., 5 minutes, 100 Kg/cm² to obtain molded products.

Comparative Example 20

Molded products were prepared in the same manner as mentioned above except that phenolic polymer B was employed in place of the phenolic resin compositions.

The physical properties of the molded products obtained above are shown in Table 7.

TABLE 7

| | Impact strength, Kg-cm[*1] | | |
|---|---|---|---|
| Molded product | −40° C. | −20° C. | normal condition |
| According to Example 32 (phenolic resin composition 32) | 20 | 30 | 40 |
| According to Example 33 (phenolic resin composition 33) | 30 | 40 | 40 |
| According to Example 34 (phenolic resin composition 34) | 40 | 50 | 50 |
| According to Example 35 (phenolic resin composition 35) | 30 | 40 | 40 |
| According to Example 36 (phenolic resin composition 36) | 20 | 30 | 40 |
| According to Example 37 (phenolic resin composition 37) | 30 | 40 | 40 |
| According to Comparative example 20 (phenolic polymer B) | 10 or less | 10 | 20 |

[*1] A wedge of ⅛ inch in diameter was applied to a molded product of 50 × 50 × 5 mm, and a weight of 1 Kg was dropped from an optional height to observe a height (cm) at which crack occurred in the molded product.

As seen from Table 7, a notable improvement in the impact strength not only under normal condition but also at low temperatures is observed with phenolic polymer B according to the method of the present invention.

Example 38

As a polymer of phenol and p-xylylene dialkyl ether, a polymeric substance having a softening point of 85° to 105° C. (Xylok 225, tradename of a product made by Albright & Wilson Ltd.) (hereinafter abbreviated to phenolic polymer C) was employed.

Rubber (1) (150 g) were added to 500 g of the phenolic polymer C, and water was distilled off by vacuum drying and removed to the outside of the system. The resulting material was melt-kneaded by means of heated rolls at 160° C. for 15 hours to obtain a phenolic resin composition 38.

Example 39

Similarly, 75 g of rubber solution (5) were added to 500 g of the phenolic polymer C, and solvent was distilled off by vacuum drying and removed to the outside of the system. The resulting material was melt-kneaded by means of heated rolls at 160° C. for 15 minutes to obtain a phenolic resin composition 39.

Example 40

Similarly, 150 g of rubber solution (5) were added to 500 g of the phenolic polymer C, and solvent was distilled off by vacuum drying and removed to the outside of the system. The resulting material was melt-kneaded by means of heated rolls at 160° C. for 15 minutes to obtain a phenolic resin composition 40.

Example 41

Similarly, 50 g of rubber (6) were added to 500 g of the phenolic polymer C, and the resulting material was melt-kneaded by means of heated rolls at 160° C. for 15 minutes to obtain a phenolic resin composition 41.

Example 42

Similarly, 200 g of rubber solution (7) were added to 500 g of the phenolic polymer C, and solvent was distilled off by vacuum drying and removed to the outside of the system. The resulting material was melt-kneaded by heated rolls at 160° C. for 15 minutes to obtain a phenolic resin composition 42.

Example 43

Similarly, 50 g of rubber (10) were added to 500 g of the phenolic polymer C, and the resulting material was melt-kneaded by means of heated rolls at 160° C. for 15 minutes to obtain a phenolic resin composition 43.

Employing the respective phenolic resin compositions obtained in Examples 38 to 43, together with other materials according to the following formulation, molding materials were prepared:

| | |
|---|---|
| Phenolic resin composition | 100 parts by weight |
| Hexamethylenetetramine | 12 parts by weight |
| Magnesium stearate | 2 parts by weight |
| Asbestos powder | 60 parts by weight |

The above blends were kneaded by means of heated rolls at 105° C. for 5 minutes, and then molded under the conditions of 170° C., 5 minutes, 100 Kg/cm² to obtain molded products, which were then maintained at 180° C. for 10 hours to effect post-cure.

Comparative Example 21

A molded product was prepared in the same manner as mentioned above except that phenolic polymer C was employed in place of the phenolic resin compositions.

The physical properties of the molded products obtained above are shown in Table 8.

TABLE 8

| | Impact strength, Kg-cm[*1] | | |
|---|---|---|---|
| Molded product | −40° C. | −20° C. | normal condition |
| According to Example 38 (phenolic resin composition 38) | 20 | 30 | 30 |
| According to Example 39 | 20 | 30 | 30 |

TABLE 8-continued

| Molded product | Impact strength, Kg-cm[*1] | | |
|---|---|---|---|
| | −40° C. | −20° C. | normal condition |
| (phenolic resin composition 39) According to Example 40 (phenolic resin composition 40) | 30 | 40 | 40 |
| According to Example 41 (phenolic resin composition 41) | 20 | 30 | 30 |
| According to Example 42 (phenolic resin composition 42) | 20 | 20 | 30 |
| According to Example 43 (phenolic resin composition 43) | 20 | 30 | 30 |
| According to Comparative example 21 (phenolic polymer C) | 10 or less | 10 | 20 |

[*1] A wedge of ⅛ inch in diameter was applied to a molded product of 50 × 50 × 5 mm, and a weight of 1 Kg was dropped from an optional height to observe a height (cm) at which crack occurred in the molded product.

As seen from Table 8, a notable improvement in the impact strength not only under normal condition but also at low temperatures is observed with phenolic polymer C according to method of the present invention.

Example 44

Employing the phenolic resin composition obtained in Example 9, together with other materials according to the following formulation, a molding material was prepared:

| Phenolic resin composition | 100 parts by weight |
| Hexamethylenetetramine | 12 parts by weight |
| Magnesium stearate | 1 parts by weight |

The blend was kneaded by means of heated rolls at 105° C. for 3 minutes to obtain a molding powder. With 20 parts by weight of this molding powder were mixed 80 parts by weight of Hedman Cathionic fiber (made by Hedmannine's Limited, Canada) and 10 parts by weight of methanol. They were molded under the conditions of 170° C., 20 minutes, 100 Kg/cm² to obtain a molded product, which was further maintained at 175° C. for 10 hours to effect post-cure.

Comparative Example 22

A molded product was prepared in the same manner as mentioned above, except that a commercially available nitrile butadiene rubber (Hica 1411, tradename of a product made by Nihon Geon Co. Japan; acrylonitrile content, 41% by weight).

Hot hardness of molded products obtained in Example 44 and Comparative Example 22 are shown in FIG. 1.

As seen from FIG. 1, the molded product prepared employing the phenolic resin composition of the present invention is less in the proportion of reduction in the surface hardness at high temperatures than that in the case of conventional composition, and hence is suitable as binders such as brake linings, etc.

What is claimed is:

1. Phenolic resin compositions comprising 100 parts by weight of a polymeric substance having a phenolic OH group selected from the group consisting of a phenolic resin and a phenolic polymer and 1 to 100 parts by weight of rubber containing an epoxy group in its molecule and having an epoxy equivalent of 500 to 30,000, wherein said rubber containing an epoxy group is selected from the group consisting of a butadiene copolymer comprising butadiene as the main component, a urethane polymer and a chloroprene copolymer and has a glass transition temperature of 25° C. or lower.

2. Phenolic resin compositions according to claim 1 wherein said polymeric substance having a phenolic OH group is a phenolic resin selected from the group consisting of novolak type phenolic resins, novolak type phenolic resins having a high content of ortho bond and resol type phenolic resins.

3. Phenolic resin compositions according to claim 1 wherein said polymeric substance having a phenolic OH group is a phenolic polymer selected from the group consisting of alkenylphenol polymers, copolymers of an alkenylphenol with another polymerizable monomer, copolymers of a phenolic compound with a p-xylylene dihalide and copolymers of a phenolic compound with a p-xylylene dialkyl ether.

4. Phenolic resin compositions according to claim 1 wherein said polymeric substance having a phenolic OH group is a phenolic resin and said rubber containing an epoxy group is a butadiene copolymer.

5. Phenolic resin compositions according to claim 1 wherein said polymeric substance having a phenolic OH group is a phenolic resin and said rubber containing an epoxy group is a urethane polymer.

6. Phenolic resin compositions according to claim 1 wherein said polymeric substance having a phenolic OH group is a phenolic polymer and said rubber containing an epoxy group is a butadiene copolymer.

7. Phenolic resin compositions according to claim 1 wherein said polymeric substance having a phenolic OH group is a phenolic polymer and said rubber containing an epoxy group is a urethane rubber.

8. Phenolic resin compositions obtained by melt-mixing 100 parts by weight of a phenolic resin with 1 to 100 parts by weight of a rubber having an epoxy group in its molecule and having an epoxy equivalent of 500 to 30,000, wherein said rubber containing an epoxy group is selected from the group consisting of a butadiene polymer comprising butadiene as the main component, a urethane polymer and a chloroprene copolymer and has a glass transition temperature of 25° C. or lower.

* * * * *